United States Patent [19]

Marse et al.

[11] Patent Number: 4,605,989
[45] Date of Patent: Aug. 12, 1986

[54] ELECTRODES FOR DOUBLE LAYER CAPACITORS

[75] Inventors: Allen V. Marse, Independence; Phil D. Bennett, Cleveland Hts.; Donald L. Boos, Garfield Hts., all of Ohio

[73] Assignee: The Standard Oil Company, Cleveland, Ohio

[21] Appl. No.: 764,379

[22] Filed: Aug. 12, 1985

[51] Int. Cl.[4] .............................................. H01G 9/02
[52] U.S. Cl. .................................................... 361/433
[58] Field of Search ............ 361/433 A, 433 J, 433 S

[56] References Cited
U.S. PATENT DOCUMENTS

| | | | |
|---|---|---|---|
| 3,105,178 | 9/1963 | Meyers | 361/433 X |
| 3,536,963 | 10/1970 | Boos | 361/433 |
| 3,652,902 | 3/1972 | Hart et al. | 361/433 |
| 4,023,079 | 5/1977 | Selover et al. | 361/433 |
| 4,313,084 | 1/1982 | Hosokawa et al. | 323/370 |
| 4,337,501 | 6/1982 | Mund et al. | 361/433 |
| 4,414,607 | 11/1983 | Sekido et al. | 361/433 |
| 4,438,481 | 3/1984 | Phillips et al. | 361/433 |
| 4,488,203 | 12/1984 | Muranaka et al. | 361/433 |

*Primary Examiner*—Donald A. Griffin
*Attorney, Agent, or Firm*—H. M. Snyder; D. M. Ronyak; G. R. Plotecher

[57] ABSTRACT

In double layer capacitors having carbon electrodes, the electrodes contain at least 1%, by weight, of an inert particulate material to reduce the leakage current of the capacitor. The inert particulate material is selected from the group comprising $SiO_2$, $Al_2O_3$, SiC and aluminum silicates.

6 Claims, 2 Drawing Figures

ELECTRODES FOR DOUBLE LAYER CAPACITORS

BACKGROUND OF THE INVENTION

I. Field of the Invention

This invention is concerned with double layer capacitors and, more particularly, with improved electrodes for the capacitor.

II. Description of the Prior Art

Double layer capacitors are disclosed in prior U.S. patents including: U.S. Pat. Nos. 3,536,963, 3,652,902, 4,327,400, 4,394,713.

In general, the above patents describe double layer capacitors which comprise a pair of polarization electrodes having a separating medium therebetween. The electrodes are composed of a solid and liquid phase and the electric double layer which characterizes these capacitors is formed at the interface between the solid and liquid (electrolyte) phases of the electrodes. The separating medium acts as an electronic insulator between the electrodes, but is sufficiently porous to permit ion migration therethrough.

A double layer capacitor is therefore made up ot two half-cells assembled on either side of a separator element. Each half-cell comprises an electrode element, a horizontally enclosing cell wall for the electrode element and a conductor element contacting one end wall of the electrode element. The cell wall and conductor element, when assembled, thus contact and confine the electrode element on the side and one end thereof.

Double layer capacitors can be made in miniature size, yet they exhibit very large capacitance when compared with conventional capacitors of similar or near similar size.

In the description herebelow, reference will be made to the "leakage current" of capacitors. "Leakage current" is defined as the internal mechanism by which the capacitor self-discharges. It is measured by determining the current required to maintain the capacitor at a given charging voltage.

Where charged capacitors are to be stored for varying periods prior to use, the leakage current becomes significant because this determines the "shelf life" of the unit. It would be especially valuable to have a capacitor which would reliably retain a useful voltage level for storage periods of several months or longer.

It has been the practice to heat treat double layer capacitors after assembly because such treatment has been found to be effective in reducing the leakage current. This heat treatment is relatively lengthy (20 hours or more) and expensive and it will be appreciated that elimination of the heat treatment, if possible, is highly desirable.

SUMMARY OF THE INVENTION

The present invention is directed to an improved double layer capacitor having electrodes comprising particulate carbon and an electrolyte to which is added at least 1%, by weight, of an inert particulate substance. The inert substance is selected from the group comprising $SiO_2$, $Al_2O_3$, SiC and aluminum silicates. An especially advantageous range of addition for the inert component is from about 3% to about 6%, by weight. When provided with such electrodes the capacitors exhibit low leakage currents without benefit of heat treatment.

DETAILED DESCRIPTION OF THE INVENTION

Figure 1:
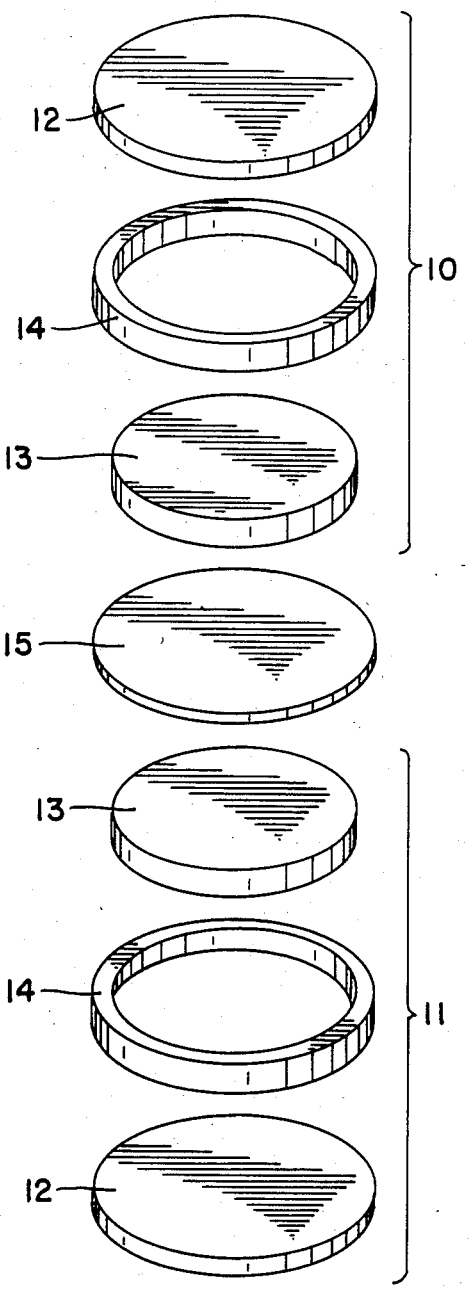
FIG. 1 is an exploded view of a single cell electrolytic double layer capacitor of the invention.
Figure 2:
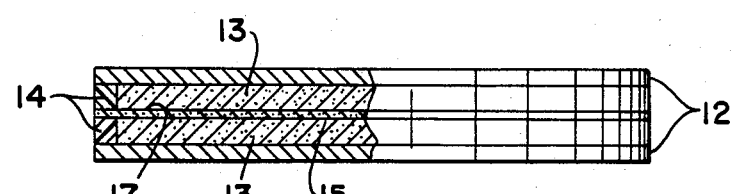
FIG. 2 is an elevational sectional view schematically showing an assembled single cell electrolytic double layer capacitor of the type shown in FIG. 1.

In FIGS. 1 and 2, the single cell double layer capacitor depicted comprises two half-cells 10 and 11 assembled so that they contact the separator member 15. Each half-cell comprises a collector member 12, which is made of an impervious conducting and ionic insulating material, a cell wall or gasket 14 affixed to collector member 12, preferably made of an insulating material, and a carbon electrode 13 located in the electrode cavity 17 defined by collector member 12 and cell wall 14.

The collector member 12 may be made of carbon-loaded butyl rubber, metals such as lead, nickel, tantalum, or other inert impervious conducting material, such as other carbon-loaded plastics. Collector member 12 is characterized by its electrical conducting property and its chemical inertness to the particular electrolyte employed at the potential impressed upon it. Its primary functions are as a current collector and inter-cell ionic insulator.

Cell wall or gasket 14 has the function of confining electrode 13 in electrode cavity 17 and is somewhat flexible to accommodate expansion and contraction of the electrode. Cell wall 14 may be made of butyl rubber compounds, and, when the collector member is also made of a butyl rubber compound, the cell wall 14 and the collector member 12, as assembled, can be vulcanized at the same time to form a strong bond with cross-linked polymer chains across the juncture of these members.

Separator 15 is generally made of highly porous material which functions as an electronic insulator between the electrodes, yet affording free and unobstructed movement to the ions in the electrolyte. The pores of the separator 15 must be small enough to prevent carbon-to-carbon contact between the opposing electrodes, since such a condition would result in a short circuit and consequent rapid depletion of the charges accumulated on the electrodes. It has been found that a heat treatment of the capacitor after assembly reduces the leakage current. This desirable result is attributed to the effect of the heat treatment upon the pores of the separator; it has been determined that the pores are reduced in size by the treatment. A typical heat treatment is carried out at 80° C. for 20 hours or more. Some small reduction in capacitance is experienced, but this is an acceptable "trade-off." Conventional battery separators may also be suitable provided they are strong enough to resist crushing during the assembly process and have pores small enough to prevent carbon particles from penetrating through the separator. Materials such as porous polyvinyl chloride, porous polypropylene, cellulose acetate and mixed esters of cellulose have been tried and found to be useful. Prior to its use the separator may be saturated with electrolyte for about 15 minutes or less. The saturation step is not required in all cases.

Carbon electrode 13 consists of high surface area or activated carbon, say 100 to 2000 meters $^2$/g, and an electrolyte associated therewith. Activation of carbon is a process by means of which greatly improved absorption properties and surface area are imparted to a naturally occurring carbonaceous material. Because electrical eneergy storage of a capacitor is apparently based on surface area, an increase in energy storage can be expected from an increase in surface area, as by activation.

An extensive discussion of activation of carbon is set forth in U.S. Pat. No. 3,536,963 and need not be repeated here.

Suitable electrodes may be made from carbon fiber or from activated carbon particles. Carbon fiber having a high surface area may be obtained by carbonizing made from materials such as rayon fibers. The carbon fibers obtained are then impregnated with electrolyte to serve as the electrode. Activated carbon particles may be made into a carbon paste electrode as described in the above mentioned U.S. Pat. No. 3,536,963. In preparing such a carbon paste electrode, activated carbon, in the form of powder or fine particles, is mixed with an electrolyte to form a thick slurry. The use of coarse carbon particles should be avoided since projections of the coarse particles would tend to penetrate the separator and establish carbon-to-carbon contact between the opposing electrodes, thus causing a short. Water or other diluent can be used to facilitate preparation of the slurry. After the slurry is formed and the carbon and the electrolyte are well dispersed, excess water or diluent is extracted by conventional means, leaving a viscous paste. An electrode pellet is formed from the paste by placing a batch of the paste under a ram and applying a predetermined pressure. Upon application of pressure, some liquid will generally exude from the paste.

An electrolyte commonly used in double layer capacitors is a 25 wt. % solution of $H_2SO_4$ containing a small amount of a bromide, say 0.1 to 10 moles per liter of electrolyte, as a voltage regulator.

The inert additive may be added to the dry carbon fiber or particles prior to mixing with the electrolyte or it may be added to the moist or paste carbon after the electrolyte has been introduced.

Examples of double layer capacitors of the invention are assembled with the principle elements of each unit cell being (1) a pair of pressed activated carbon (APL Carbon) electrodes impregnated with eletrolyte, (2) a current collector of carbon-loaded butyl rubber film (a material sold by the Industrial Electronic Rubber Company) fixed in electrical contact with each electrode, and (3) a porous film separator composed of a hydrophilic polypropylene sold under the name Celgard 3401 by Celanese Co. positioned between the electrodes. The unit cells are 1.6 inches in diameter (40.6 mm).

The inert addition to the electrode material is made, prior to pressing, to the electrodes of two double layer capacitors at each level of addition; 3%, 6% and 10%, by weight. The data obtained on these capacitors, where the inert addition is $SiO_2$, is set forth in the table below. Leakage current in each case was measured before and after heat treatment. The heat treatment consisted of heating the capacitors to 80° C. and maintaining at that temperature for 20 hours to reduce the porosity of the separator element.

TABLE

| Cell | $SiO_2$* Wt. % | Leakage Current (ma) | |
|---|---|---|---|
| | | Before Heat Treatment | After Heat Treatment |
| 66A | 3 | 0.20 | 0.10 |
| 66B | 3 | 0.20 | 0.09 |
| 67A | 6 | 0.15 | 0.10 |
| 67B | 6 | 0.17 | 0.12 |
| 67A-1 | 10 | 0.18 | 0.09 |
| 67B-1 | 10 | 0.22 | 0.08 |

*Added as Cabosil, trade name for colloidal pyrogenic $SiO_2$ available from the Cabot Corporation.

The leakage current values in the above table should be compared with a typical leakage current of 0.4 ma which is characteristic of a heat treated electrode material which does not contain the inert additive of the present invention.

It is thus seen that a very substantial reduction in leakage current is achieved by the simple expedient of introducing a small amount of inert material into the electrode mix. However, it should be noted that the addition of amounts over about 6%, by weight, do not further improve the results obtained.

The data also indicate that a further reduction in leakage current can be obtained by heat treating electrodes containing inert material, but this will not be necessary in most cases.

While explanations have been offered for certain of the results observed, applicants do not wish to be bound by any particular explanation, since other theories may be equally valid.

There has thus been provided a relatively simple process for manufacturing carbon electrode members which confer improved leakage current characteristics on double layer capacitors and render an additional heat treatment step unnecessary in most cases. Although the present invention has been described in conjunction with preferred process embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A double layer capacitor comprising a first and second electrode, said electrodes comprising a high surface area carbon constituent and an electrolyte, and an ionically conductive separator means between and in contact with said electrodes electronically separating said electrodes from each other, the improvement comprising providing in said electrodes at least 1%, by weight, of an inert particulate material selected from the group consisting of $SiO_2$, $Al_2O_3$, SiC and aluminum silicates to reduce the leakage current of said capacitor.

2. The double layer capacitor of claim 1 wherein the inert particulate material in said electrodes is $SiO_2$.

3. The double layer capacitor of claim 2 wherein $SiO_2$ is present in an amount from about 3% to about 6%, by weight.

4. An electrode material capable of conferring a low leakage current characteristic on a double layer capacitor comprising as a major constituent an electroloyte and at least 1%, by weight, of an inert particulate material selected from the group consisting of $SiO_2$, $Al_2O_3$, SiC and aluminum silicates.

5. The electrode material of claim 4 wherein the inert particulate material is $SiO_2$.

6. The electrode material of claim 5 wherein the $SiO_2$ is present in an amount of from about 3% to about 6%, by weight.

* * * * *